United States Patent [19]

Suzuki et al.

[11] 4,260,414
[45] Apr. 7, 1981

[54] PROCESS FOR RECOVERING AND UTILIZING USEFUL SUBSTANCES FROM MOLTEN METAL PRODUCED DURING REDUCTION TREATMENT OF STEEL SLAG

[75] Inventors: Gyoichi Suzuki, Tokyo; Ryo Ando, Yokohama; Tatsuo Koyama, Yokohama; Shoji Kubodera, Yokohama; Renichi Kondo, Tokyo, all of Japan

[73] Assignee: Nippon Kokan Kabushiki Kaisha, Tokyo, Japan

[21] Appl. No.: 44,375

[22] Filed: Jun. 1, 1979

[30] Foreign Application Priority Data

Jun. 30, 1978 [JP] Japan .................................. 53/78514

[51] Int. Cl.³ .............................................. C21B 3/04
[52] U.S. Cl. ............................................. 75/60; 75/24; 75/101 R
[58] Field of Search .......................... 75/24, 60, 101 R

[56] References Cited

U.S. PATENT DOCUMENTS

| 1,534,819 | 4/1925 | Seth | 75/60 |
| 1,691,274 | 11/1928 | Flodin et al. | 75/24 |
| 2,539,485 | 1/1951 | Schoenlaub | 75/24 |
| 2,732,293 | 1/1956 | Perrin et al. | 75/24 |
| 2,746,857 | 5/1956 | Wright | 75/24 |
| 3,091,524 | 5/1963 | Johnson | 75/24 |

FOREIGN PATENT DOCUMENTS

| 2172206 | 9/1973 | France | 75/24 |
| 745047 | 2/1956 | United Kingdom | 75/24 |
| 995907 | 6/1965 | United Kingdom | 75/24 |
| 1097811 | 1/1968 | United Kingdom | 75/24 |
| 1182956 | 3/1970 | United Kingdom | 75/24 |
| 1207003 | 9/1970 | United Kingdom | 75/24 |
| 1339858 | 12/1973 | United Kingdom | 75/24 |

*Primary Examiner*—M. J. Andrews
*Attorney, Agent, or Firm*—Frishauf, Holtz, Goodman & Woodward

[57] ABSTRACT

A process for recovering and utilizing useful substances from a molten metal produced, when manufacturing a steel slag cement from a steel slag discharged from a top-blowing oxygen converter, during a reduction treatment of steel slag, which comprises the steps of: subjecting, in an acidic refining furnace, said molten metal to a primary oxidation refining treatment and a secondary oxidation refining treatment to recover a primary slag containing a large amount of $TiO_2$ and $SiO_2$ and a secondary slag containing a large amount of MnO and $V_2O_5$, said primary slag being utilized as a blast furnace burden raw material serving as a $TiO_2$ source, and said secondary slag being utilized as a raw material for producing ferromanganese and ferrovanadium; then, subjecting, in a basic Kaldo furnace, said molten metal to an oxidation refining treatment several times to recover a low-phosphorus high-quality steel and a slag, said slag being utilized as a Thomas phosphoric fertilizer.

7 Claims, 4 Drawing Figures

PROCESS FOR RECOVERING AND UTILIZING USEFUL SUBSTANCES FROM MOLTEN METAL PRODUCED DURING REDUCTION TREATMENT OF STEEL SLAG

REFERENCE TO PATENTS, APPLICATIONS AND PUBLICATIONS PERTINENT TO THE INVENTION

As far as we know, prior documents pertinent to the present invention are as follows:

(1) Japanese Patent Provisional Publication No. 83,693/74 of Aug. 12, 1974;

(2) Japanese Patent Provisional Publication No. 73,114/77 of June 18, 1977;

(3) Japanese Patent Provisional Publication No. 75,607/77 of June 24, 1977;

(4) The U.S. Pat. No. 3,091,524 of May 28, 1963;

(5) German Patent Provisional Publication (Offenlegungsschrift) No. 2,307,237 of Aug. 23, 1973; and, (6) Japanese Patent Application No. 73,108/76 of June 23, 1976.

Based on the above-mentioned Japanese Patent Application No. 73,108/76, the following corresponding foreign patent applications have been filed:

(a) British Patent Application No. 21,759/77 of May 24, 1977 (Publication No. 1,537,194 of Dec. 29, 1978);

(b) French Patent Application No. 77 19,172 of June 22, 1977;

(c) German Patent Application No. P27 28 289.9 of June 23, 1977; and, (d) The U.S. Patent Application Ser. No. 804,328 of June 7, 1977 (Notice of Allowance of May 1, 1978).

The contents of the prior arts disclosed in the above-mentioned prior documents (1) to (5) will be commented on in the "BACKGROUND OF THE INVENTION" presented hereafter, and the contents of the prior art disclosed in the above-mentioned prior document (6), in the "DETAILED DESCRIPTION OF PREFERRED EMBODIMENTS" presented hereafter.

Each one copy of the above-mentioned prior documents (1), (2), (3) and (5) is attached hereto. With regard to the above-mentioned document (6), refer to the U.S. Patent Application No. 804,328/77 corresponding thereto.

FIELD OF THE INVENTION

The present invention relates to a process for recovering and utilizing useful substances from a molten metal produced, when manufacturing a steel slag cement from a steel slag discharged from a top-blowing oxygen converter, during a reduction treatment of said steel slag.

BACKGROUND OF THE INVENTION

When refining a molten pig iron into a steel in a top-blowing oxygen converter (hereinafter simply referred to as a ("converter"), the amount of slag discharged from the converter (hereinafter referred to as "steel slag") ranges from about 100 to about 150 kg per ton of crude steel, resulting in a huge annual amount in total.

When such a steel slag discharged in a large quantity is employed as a subbase course material or an aggregate (hereinafter generally referred to as "aggregate"), said steel slag is susceptible to disintegration, because of the expansion in volume with the lapse of time under the effect of free lime (free CaO) and dicalcium silicate ($2CaO \cdot SiO_2$) contained in said steel slag. In addition, because a steel slag has a relatively high iron content, the aggregate produced therefrom has a higher specific gravity than natural aggregates. For these reasons, a steel slag is very rarely utilized as aggregates, but mostly disposed of as waste for reclamation at present, except for only a very small portion used as one of blast furnace burden raw materials. However, in order to dispose of these large quantities of steel slag in the form of the waste for reclamation, vast places for reclamation are required, while it is becoming increasingly difficult to find such places for reclamation. In addition, the transporation of the waste is very costly. Development of a method for effectively utilizing or efficiently disposing of a steel slag only increasing in amount is therefore one of the important tasks requiring an urgent solution in the field of steelmaking.

Under such circumstances, many studies have been made in various sectors of industry with a view to effectively utilizing a steel slag discharged from a converter, and these studies may be broadly classified into the following categories:

(1) Studies on the removal of phosphorus contained in steel slag in an attempt to increase the usage of steel slag as a raw material for blast furnace or converter operation;

(2) Studies on the utilization of a steel slag as a construction or building material; and, (3) Studies on the use of a steel slag as a fertilizer.

All of the above-mentioned studies except for those on the removal of phosphorus contained in a steel slag are to utilize a steel slag with the original chemical composition thereof as it is without changing its original chemical composition. Depending upon the usage of a steel slag, the utilization thereof with an unchanged chemical composition results in a problem in quality because of the coexistence of useful and detrimental substances, thus preventing the steel slag from going beyond the limit of a low-quality substitute material. Therefore, only a small quantity of steel slag can be utilized when, for example, employing the steel slag as a substitute for the cement material.

In order to utilize a steel slag effectively and in a large quantity, therefore, it is necessary to remove detrimental substances and separate and recover useful substances from constituents of the steel slag, and in this connection, the following proposals have been made:

(1) A melting process of steel slag, as disclosed in Japanese Patent Provisional Publication No. 83,693/74 of Aug. 12, 1974, which comprises:

charging, into an electric melting furnace containing a molten pig iron, a molten steel slag together with bauxite as an alumina ($Al_2O_3$) source; contacting said molten slag with said molten pig iron by stirring, while heating the contents of said furnace; transferring the Mn, P and Fe constituents contained in said molten steel slag into said molten pig iron by reducing MnO, $P_2O_5$ and $Fe_2O_3$ contained in said molten steel slag with carbon contained in said molten pig iron, thereby eliminating constituents detrimental to cement from said molten steel slag; discharging said molten steel slag thus treated from said melting furnace and rapidly cooling said molten steel slag for solidification; and finely pulverizing said solidified steel slag, thereby manufacturing an alumina cement from the steel slag (hereinafter referred to as the "prior art (1)").

(2) A process for recovering Fe and P constituents in a steel slag, as disclosed in Japanese Patent Provisional Publication No. 73,114/77 of June 18, 1977, which comprises:

adjusting the chemical composition of a molten steel slag contained in a vessel to a chemical composition comprising from 10 to 21 wt.% $SiO_2$, from 2.5 to 7 wt.% $Al_2O_3$, from 18 to 28 wt.% total Fe, and from 26 to 38 wt.% CaO and reducing the viscosity of said molten steel slag by adding iron oxides and a mineral mainly comprising $SiO_2$; reducing $Fe_2O_3$ and $P_2O_5$ contained in said molten steel slag through reactions caused in said molten steel slag under a reducing atmosphere by the sensible heat of said molten steel slag, and as required, by a sufficient heat supplied from outside, thereby separating molten Fe from said molten steel slag and transferring P constituent contained in said molten steel slag into said molten Fe; and utilizing said steel slag thus treated and almost free of P as a source of lime and Mn for blast furnace burden (hereinafter referred to as the "prior art (2)").

(3) A process of treating a steel slag for recovering useful substances from said steel slag, as disclosed in Japanese Patent Provisional Publication No. 75,607/77 of June 24, 1977, which comprises:

charging a steel slag, together with a carbonaceous reducing agent, into a reducing furnace; and reducing said steel slag by heating at a temperature of at least 1,600° C. in said reducing furnace, thereby recovering calcium carbide and ferromanganese from said steel slag (hereinafter referred to as the "prior art (3)").

(4) In a process for upgrading molten basic slags containing desired metals by removing unwanted impurities therefrom, the improvements as disclosed in the U.S. Pat. No. 3,091,524 of May 28, 1963, which comprise:

(a) contacting said slag with a molten alloy within an electric furnace and at a suitable smelting temperature;

(b) carbonaceously reducing into said alloy as much of the desired metal as is required to simultaneously reduce said unwanted impurities from said slag; and, (c) blowing an oxygen-containing gas into the alloy to reoxydize at least a major portion of the desired metal back into the slag and retaining a major portion of impurities in the metal, whereby said slag is freed of unwanted impurities with only a small loss of the desired metal (hereinafter referred to as the "prior art (4)").

(5) A process for treating a steel slag, as disclosed in German Patent Provisional Publication No. 2,307,237 of Aug. 23, 1973, which comprises:

separating a molten steel slag into a slag and a metal through a reduction treatment in an electric furnace, whereby said slag is used as a material for cement and said metal is used as a material for ferromanganese (hereinafter referred to as the "prior art (5)").

In the prior art (1), the reduction treatment of the steel slag requires a large quantity of molten pig iron and a considerable amount of heat. In addition, in the prior art (1) in which such constituents as P and Mn contained in the steel slag are transferred into the molten pig iron, the reuse of said molten pig iron having high P and Mn constituents for steelmaking requires elimination of these constituents from said molten pig iron, thus requiring much time and costs.

In the prior art (2) in which the steel slag is subjected to a reduction treatment to separate a molten metal mainly comprising Fe from the steel slag, the P constituent in the steel slag is transferred into said molten metal, whereas the Mn constituent more or less remains in the steel slag. While, in the prior art (2), the steel slag from which the P constituent has thus been removed is used as a source of lime and Mn for blast furnace burden, no contemplation is made on the utilization of said molten metal having contained P in a large quantity.

In the prior art (3) calcium carbide and ferromanganese are recovered from the steel slag through a reduction treatment of said steel slag. However, the calcium carbide thus obtained has a low purity, and the ferromanganese thus obtained is of a low grade with an Mn content of only 10-odd wt.%, both posing quality difficulties.

The prior art (4) is as problematic as the aforementioned prior art (1) in that it is necessary to use a molten alloy in a considerable amount with a view to removing unwanted impurities.

The prior art (5) is somewhat similar to the process of the present invention presented later in that a molten steel slag is separated into a slag and a metal by reducing the steel slag in an electric furnace; the slag thus separated is used as a cement or as a material for cement; and the metal thus separated is used as ferromanganese. However, the ferromanganese obtained in accordance with the prior art (5) is inferior in quality because of the high P content. Furthermore, in the prior art (5), no provision is made to further decompose the metal thus separated to recover useful substances with a high added value.

In the prior arts (1) to (5), as mentioned above, it is proposed to subject a steel slag to a reduction treatment to separate said steel slag into a slag and a metal, and to utilize said slag and said metal for various uses, whereas no proposal is made with regard to a further treatment of the metal thus separated for decomposition and the resulting recovery of useful substances with a higher added value from said metal.

SUMMARY OF THE INVENTION

An object of the present invention is therefore to provide a process for separating and recovering useful substances from a molten metal produced, when manufacturing a steel slag cement from a steel slag by subjecting said steel slag discharged from a top-blowing oxygen converter to a reduction treatment and then subjecting said reduced steel slag to an oxidation treatment, during said reduction treatment of said steel slag.

In accordance with one of the features of the present invention, there is provided a process for recovering and utilizing useful substances from a molten metal produced, when manufacturing a steel slag cement from a steel slag discharged from a top-blowing oxygen converter, during a reduction treatment of said steel slag, which comprises the steps of:

(1) oxidizing most of titanium (Ti) and silicon (Si) contained in said molten metal by subjecting, in an acidic refining furnace lined with an acidic refractory, said molten metal to a primary oxidation refining treatment, to cause the resultant titanium oxide ($TiO_2$) and silicon oxide ($SiO_2$) to form a primary slag on the surface of said molten metal, and discharging said primary slag from said acidic refining furnace; then, (2) oxidizing most of manganese (Mn) and vanadium (V) contained in said molten metal by subjecting, in said acidic refining furnace, said molten metal, which has been subjected to said primary oxidation refining treatment and said primary slag discharge, to a secondary oxidation refining treatment, to cause the resultant manganese oxide (MnO) and vanadium oxide ($V_2O_5$) to newly form a secondary slag on the surface of said molten metal, and discharging said secondary slag from said acidic refining furnace; and then, (3) oxidizing most of phosphorus (P) and carbon (C) contained in said molten metal by subjecting, in a basic refining furnace lined with a basic refractory, said molten metal, which has been subjected to said secondary oxidation refining treatment and said secondary slag discharge, to a third oxidation refining treatment while adding a slag forming agent, to cause the resultant phosphorus oxide ($P_2O_5$) to newly form a third slag on the surface of said molten metal, and discharging said third slag from said basic refining furnace, thereby refining said molten metal into a low-phorphorus high-quality steel.

BRIEF DESCRIPTION OF THE DRAWINGS

FIGS. 2(A), 2(B) and 2(C) are graphs illustrating, in the case where a molten metal produced during a reduction treatment of a steel slag was subjected to a secondary oxidation refining treatment after removal by oxidation of Ti and Si through a primary oxidation treatment, the relation between the time of said secondary oxidation refining treatment and the respective contents of Mn, V, P and C in said molten metal; FIG. 2(A) covering a case where, in said secondary oxidation refining treatment, a basic crucible made of magnesia was used without addition of a slag forming agent; FIG. 2(B) representing a case where, in said secondary oxidation refining treatment, a basic crucible made of magnesia was employed with addition of a slag forming agent; and, FIG. 2(C) showing a case where, in said secondary oxidation refining treatment, an acidic crucible made of silica was used without addition of a slag forming agent.

DETAILED DESCRIPTION OF PREFERRED EMBODIMENT

Figure 1:
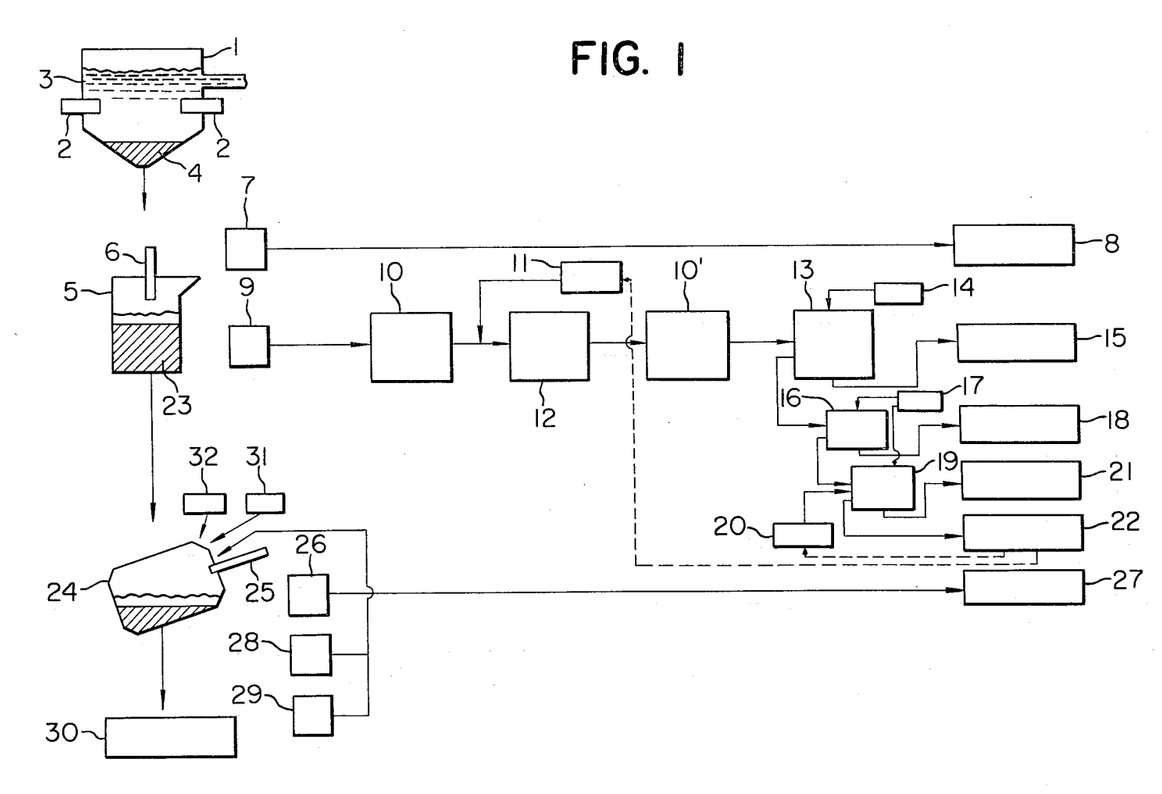
FIG. 1 is a schematic drawing illustrating an embodiment of the process of the present invention.

We have previously proposed a steel slag cement manufactured from a steel slag and a method for manufacturing same (hereinafter referred to as the "earlier invention"), as described below, in Japanese Patent Application No. 73,108/76 of June 23, 1976, which was laid open to public inspection as Japanese Patent Provisional Publication No. 221/78 as of Jan. 5, 1978:

(1) A steel slag cement manufactured from a steel slag, which consists of, in weight percentage:

| | |
|---|---|
| CaO | from 68 to 72%, |
| $SiO_2$ | from 22 to 26%, |
| $Al_2O_3$ | from 1 to 3%, |
| $Fe_2O_3$ | from 0.2 to 1.0%, |
| $P_2O_5$ | from 0.1 to 0.6%, |
| $TiO_2$ | from 0.4 to 0.9%, |
| MnO | from trace to 0.4%, |
| MgO | from 0.3 to 3.0%, |
| $CaF_2$ | from 0.3 to 2.0%, | and the balance incidental impurities, wherein in the ternary constitutional diagram of FIG. 1 of CaO-$SiO_2$-$Al_2O_3$, the area representing the range of the CaO, $SiO_2$ and $Al_2O_3$ contents is situated on the side of higher $SiO_2$ content relative to the line connecting $3CaO.SiO_2$ and $3CaO.Al_2O_3$, said area not being traversed by the line connecting $3CaO.SiO_2$ and $12CaO.7Al_2O_3$.

(2) A method for manufacturing a steel slag cement, which comprises:

preparing a reduced steel slag by reducing a steel slag, discharged from a steelmaking furnace, in a reduction furnace while adding a carbonaceous reducing agent, constituents detrimental to cement contained in said steel slag being mostly removed through said reduction treatment, and the chemical composition of said reduced steel slag being adjusted principally during said reduction treatment;

preparing an oxidized steel slag by oxidizing said reduced steel slag in an oxidation furnace while adding $SiO_2$ as a chemical composition adjusting agent as required; and, finely pulverizing said oxidized steel slag, thereby obtaining a steel slag cement.

Furthermore, we have filed the following corresponding foreign patent applications, based on said Japanese Patent Application No. 73,108/76:

(a) British Patent Application No. 21,759/77 of May 24, 1977 (Publication No. 1,537,194 of Dec. 29, 1978), (b) French Patent Application No. 77 19,172 of June 22, 1977, (c) German Patent Application No. P27 28 289.9 of June 23, 1977, and (d) The U.S. Patent Application No. 804,328 of June 7, 1977 (Notice of Allowance of May 1, 1978).

An example of the chemical composition of a steel slag discharged from a converter, as the starting raw material in the aforementioned earlier invention is as follows, in weight percentage:

| | |
|---|---|
| CaO | 50.4%, |
| $SiO_2$ | 15.3%, |
| $Al_2O_3$ | 1.0%, |
| Total Fe | 16.3%, |
| MgO | 2.01%, |
| MnO | 5.21%, |
| $P_2O_5$ | 2.28%, |
| $TiO_2$ | 1.66%, |
| $V_2O_5$ | 1.21%. |

By reducing a steel slag having the above-mentioned chemical composition in a reduction furnace in accordance with the method of the earlier invention, while adding a carbonaceous reducing agent, a reduced steel slag is obtained, and at the same time, a molten metal having a chemical composition as mentioned below, in weight percentage, is produced, accumulated on the bottom of said reduction furnace, and separated from said reduced steel slag:

| | |
|---|---|
| Ti | from 2 to 6%, |
| Si | from 1 to 5%, |
| Mn | from 10 to 20%, |
| V | from 1 to 5%, |
| P | from 2 to 6%, |
| C | from 4 to 6%, | and the balance Fe and incidental impurities.

In the earlier invention, an oxidized steel slag is prepared by subjecting a reduced steel slag which has been prepared by subjecting a steel slag to a reduction treatment, to an oxidation treatment, and the resultant oxidized steel slag is pulverized to manufacture a steel slag cement, whereas no particular contemplation is made on the effective utilization of a molten metal produced during said reduction treatment of the steel slag.

From this fact in view, we have carried out extensive studies to complete a total system for manufacturing a steel slag cement from a steel slag through development of a relatively simple process requiring only low operation costs, permitting industrial and economical recovery of useful substances with a high added value from the molten metal having the above-mentioned chemical composition, produced during said reduction treatment of the steel slag in the earlier invention, and finally achieved the present invention.

Features of the process of the present invention are as follows:

(1) Most of titanium (Ti) and silicon (Si) contained in a molten metal which is produced, when manufacturing a steel slag cement from a steel slag discharged from a converter, during a reduction treatment of said steel slag, are oxidized by subjecting, in an acidic refining furnace lined with an acidic refractory, said molten metal to a primary oxidation refining treatment, to cause the resultant titanium oxide ($TiO_2$) and silicon oxide ($SiO_2$) to form a primary slag on the surface of said molten metal, and then said primary slag is discharged from said acidic refining furnace. A blast furnace burden raw material serving as a $TiO_2$ source for blast furnace operation is recovered from said primary slag.

(2) Then, most of manganese (Mn) and vanadium (V) contained in said molten metal are oxidized by subjecting, in the same acidic refining furnace, said molten metal, which has been subjected to said primary oxidation refining treatment and said primary slag discharge, to a secondary oxidation refining treatment, to cause the resultant manganese oxide (MnO) and vanadium oxide ($V_2O_5$) to newly form a secondary slag on the surface of said molten metal, and then, said secondary slag is discharged from said acidic refining furnace. By subjecting said secondary slag to a roasting treatment and a leaching treatment, a raw material mainly comprising MnO for manufacturing ferro-manganese, a raw material mainly comprising $V_2O_5$ for manufacturing ferrovanadium and a fertilizer mainly comprising dicalcium phosphate ($2CaO.P_2O_5$) are recovered from said secondary slag.

(3) Then, most of phosphorus (P) and carbon (C) contained in said molten metal are oxidized by subjecting, in a basic refining furnace lined with a basic refractory such as a Kaldo furnace, said molten metal, which has been subjected to said secondary oxidation refining treatment and said secondary slag discharge, to a third oxidation refining treatment while adding a slag forming agent, to cause the resultant phosphorus oxide ($P_2O_5$) to newly form a third slag on the surface of said molten metal, and then, said third slag is discharged from said basic refining furnace. Said molten metal is thus refined into a low-phosphorus high-quality steel. A Thomas phosphoric fertilizer or a raw material for manufacturing yellow phosphorus is recovered from said third slag. A steel slag discharged from a converter is employed as at least a part of said slag forming agent to be added during said third oxidation refining treatment.

Now, the process of the present invention is described with reference to the drawings.

FIG. 1 is a schematic drawing illustrating an embodiment of the process of the present invention. In FIG. 1, 1 is an electric reduction furnace having an electrode 2. A steel slag discharged from a converter (not shown) is charged into the reduction furnace 1 and reduced while adding a carbonaceous reducing agent in accordance with the method of the earlier invention. Through said reduction treatment, a reduced steel slag 3 is obtained, and at the same time, a molten metal 4 is produced and separated from the reduced steel slag 3 while being accumulated on the bottom of the reduction furnace 1. In the earlier invention, as mentioned above, the reduced steel slag thus obtained is then subjected to an oxidation treatment to prepare an oxidized steel slag, and, the oxidized steel slag thus obtained is pulverized to manufacture a steel slag cement.

In the process of the present invention, the molten metal 4 produced during the above-mentioned reduction treatment of the steel slag conducted in accordance with the earlier invention is used as the starting raw material. As mentioned above, the molten metal 4 has the following chemical composition, in weight percentage:

| | |
|---|---|
| Ti | from 2 to 6%, |
| Si | from 1 to 5%, |
| Mn | from 10 to 20%, |
| V | from 1 to 5%, |
| P | from 2 to 6%, |
| C | from 4 to 6%, | and, the balance Fe and incidental impurities.

In the present invention, as shown in FIG. 1, the molten metal 4 having the above-mentioned chemical composition is charged into an acidic refining furnace 5 lined with an acidic refractory such as a silica refractory, and, the molten metal 4 is oxidation-refined by blowing oxygen gas through a lance 6. Said oxidation refining is carried out twice.

More specifically, most of titanium (Ti) and silicon (Si) contained in the molten metal 4 are oxidized by a primary oxidation refining treatment, and the resultant titanium oxide ($TiO_2$) and silicon oxide ($SiO_2$) form a primary slag 7, thus causing elimination of most of Ti and Si contained in said molten metal 4. At the moment when oxidation of Ti and Si has been made sufficiently, blowing of oxygen gas through the lance 6 is temporarily discontinued, a primary slag discharge is carried out to recover the primary slag 7 containing 20 to 50 wt.% $TiO_2$, 20 to 40 wt.% $SiO_2$, 20 to 40 wt.% total Fe, 5 to 10 wt.% MnO and a small amount of $P_2O_5$.

Since the primary slag 7 has a high $TiO_2$ content as from 20 to 50 wt.%, it is possible to effectively utilize the primary slag 7 as a blast furnace burden raw material 8 applicable in substitution for iron sand as a $TiO_2$ source in blast furnace operation, or as a sintering raw material, by crushing and sizing to a prescribed particle size after cooling and solidification of said primary slag 7.

The aforementioned recovery of the primary slag 7 having high $TiO_2$ and $SiO_2$ contents through the primary oxidation refining treatment of the molten metal 4 and the primary slag discharge has an important significance over the entire process of the present invention. Iron sand is now usually used as a $TiO_2$ source for blast furnace operation. However, the price of iron sand is high for the $TiO_2$ content, as compared, for example, with the price of Ilmenite ore containing $TiO_2$ as much as about 50 wt.%, because of the high Fe content in spite of such a low $TiO_2$ content as about 10 wt.%. Therefore, the use of the primary slag 7 as a blast furnace burden raw material 8 serving to supply $TiO_2$ in place of expensive iron sand provides a remarkable advantage. In addition, another advantage is that the primary slag 7 contains 20 to 50 wt.% total Fe and 5 to 10 wt.% MnO.

After the above-mentioned primary oxidation refining treatment and primary slag discharge, blowing of oxygen gas through the lance 6 is resumed, to subject said molten metal in the acidic refining furnace 5 to a secondary oxidation refining treatment. Most of manganese (Mn) and vanadium (V) contained in said molten metal are oxidized by the secondary oxidation refining treatment, and the resultant manganese oxide (MnO) and vanadium oxide ($V_2O_5$) form a new secondary slag 9, thus causing elimination of most of Mn and V contained in said molten metal. At the moment when oxidation of Mn and V has been sufficiently carried out, blowing of oxygen gas through the lance 6 is discontinued, and a secondary slag discharge is effected to recover the secondary slag 9 containing 40 to 50 wt.% MnO, 25 to 35 wt.% $V_2O_5$, 9 to 19 wt.% total Fe, a small amount of $SiO_2$ and a small amount of $P_2O_5$.

Because the secondary slag 9 has a high MnO content as from 40 to 50 wt.% and a high $V_2O_5$ content as from 25 to 35 wt.%, a raw material for manufacturing ferromanganese and a raw material for manufacturing ferrovanadium are recovered from the secondary slag 9.

More particularly, the secondary slag 9 is crushed, after cooling and solidification, by a crusher 10 such as a rod mill to a prescribed particle size. The crushed slag 9 is added with sodium hydroxide (NaOH) 11 and mixed therewith sufficiently. The resultant mixture is then charged into a roasting kiln 12 under an acidic atmosphere for roasting. The sinter thus obtained is crushed again by a crusher 10' such as a rod mill to a prescribed particle size. The crushed sinter thus obtained is placed into a leaching tank 13 to subject to a leaching treatment by adding a filtrate 14.

Through said leaching treatment, $V_2O_5$ and $P_2O_5$ contained in said crushed sinter is dissolved into the filtrate, whereas MnO is precipitated as a residue on the bottom of the leaching tank 13. Said residue contains about 67.8 wt.% MnO, about 4.9 wt.% $SiO_2$, about 0.4 wt.% $Al_2O_3$, about 0.18 wt.% $P_2O_5$ and about 20.6 wt.% total Fe and is therefore higher in grade than a natural manganese ore. It is therefore possible to recover said residue for use as a high-quality raw material 15 for manufacturing ferromanganese. Said residue, being in the form of fine powder, is formed into pellets for use as a raw material 15 for manufacturing ferromanganese.

The filtrate used for said leaching treatment in the leaching tank 13 is, on the other hand, transferred into a first precipitation tank 16, where said filtrate is added with calcium chloride ($CaCl_2$) 17 after an adjustment to a prescribed value of pH. As a result, dicalcium phosphate ($2CaO.P_2O_5$) is produced by the reaction of P dissolved in said filtrate with $CaCl_2$, and is precipitated on the bottom of the first precipitation tank 16. Said precipitate is recovered and utilized as an effective fertilizer 18 mainly comprising $2CaO.P_2O_5$.

Then, the filtrate treated in the first precipitation tank 16 is transferred into a second precipitation tank 19, where said filtrate is added with sulfuric acid ($H_2SO_4$) 20 after an adjustment to a prescribed value of pH. As a result, vanadium oxide ($V_2O_5$) is produced by the reaction of V dissolved in said filtrate with $H_2SO_4$, and is precipitated on the bottom of the second precipitation tank 19. Said precipitate is recovered and utilized as an effective raw material 21 for manufacturing ferrovanadium. In causing the above-mentioned reaction in the second precipitation tank 19, the addition of sulfuric acid ($H_2SO_4$) 20 alone gives an extraction ratio of $V_2O_5$ of only 80 to 90%, whereas, as shown in FIG. 1, the addition of calcium chloride ($CaCl_2$) 17 together with sulfuric acid ($H_2SO_4$) 20 improves the extraction ratio of $V_2O_5$ to almost 100%.

The waste liquid left after the above-mentioned reaction in the second precipitation tank 19 is mirabilite 22 mainly comprising $Na_2SO_4$. By recovering and subjecting mirabilite 22 to an electrolysis, sulfuric acid ($H_2SO_4$) and sodium hydroxide (NaOH) are obtained. Sulfuric acid thus obtained can be reused as the sulfuric acid 20 for reaction with V in the second precipitation tank 19, and sodium hydroxide thus obtained, as the sodium hydroxide 11 for adding to the crushed secondary slag 9 to be charged into the roasting kiln 12, respectively, by recycle.

In the present invention, as described above, both the primary oxidation refining treatment and the secondary oxidation refining treatment are carried out with the use of the acidic refining furnace 5 lined with an acidic refractory. Therefore, P contained in the molten metal is hardly oxidized. Furthermore, Ti and Si contained in the molten metal are recovered first by the primary oxidation refining treatment and the primary slag discharge of the molten metal. All the useful substances recovered from the primary slag 7 and the secondary slag 9 in accordance with the present invention have a very low P content and a high purity, thus leading to an excellent grade. The primary oxidation refining treatment and the secondary oxidation refining treatment of the molten metal may be carried out either by blowing oxygen gas through the lance 6 from above into the acidic refining furnace 5, or by attaching a porous plug to the bottom of the acidic refining furnace 5 and blowing oxygen gas through said porous plug from below into the acidic refining furnace 5. In place of oxygen gas, a gas containing oxygen such as air may be used.

Now, when applying the secondary oxidation refining treatment and the secondary slag discharge to the molten metal from which Ti and Si have been removed by oxidation through the primary oxidation refining treatment and the primary slag discharge, necessary conditions are as follows:

(1) Mn and V contained in the molten metal should be oxidized as efficiently as possible to cause the resultant MnO and $V_2O_5$ to form the secondary slag 9 on the surface of the molten metal; and, (2) on the other hand, oxidation of P and C contained in the molten metal should be inhibited as far as possible so that P and C may remain in the molten metal.

We have carried out many studies and tests to establish an appropriate secondary oxidation refining treatment of the molten metal satisfying the above-mentioned necessary conditions.

Figure 2A:
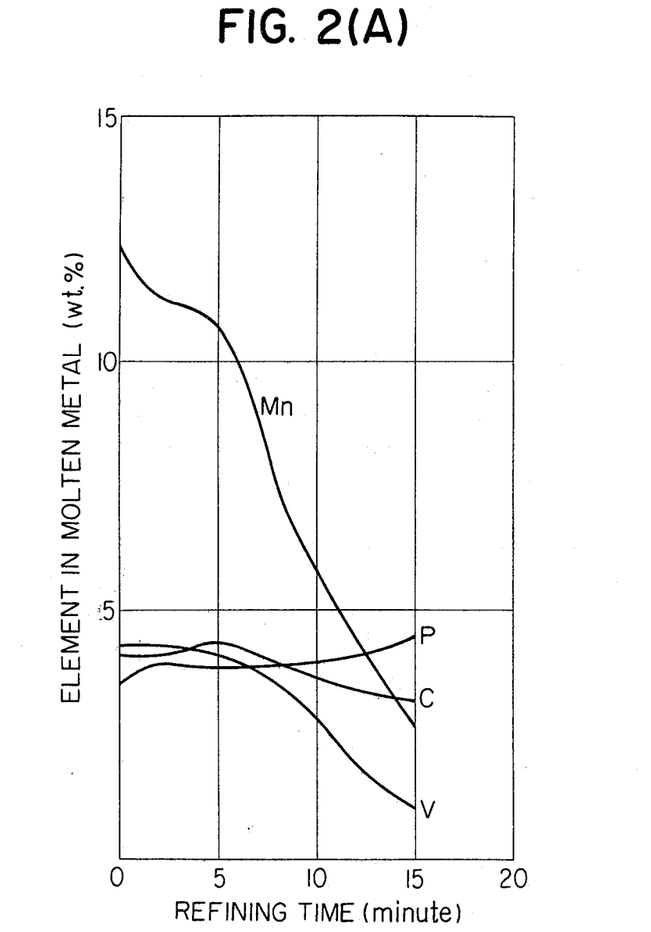
Figure 2B:
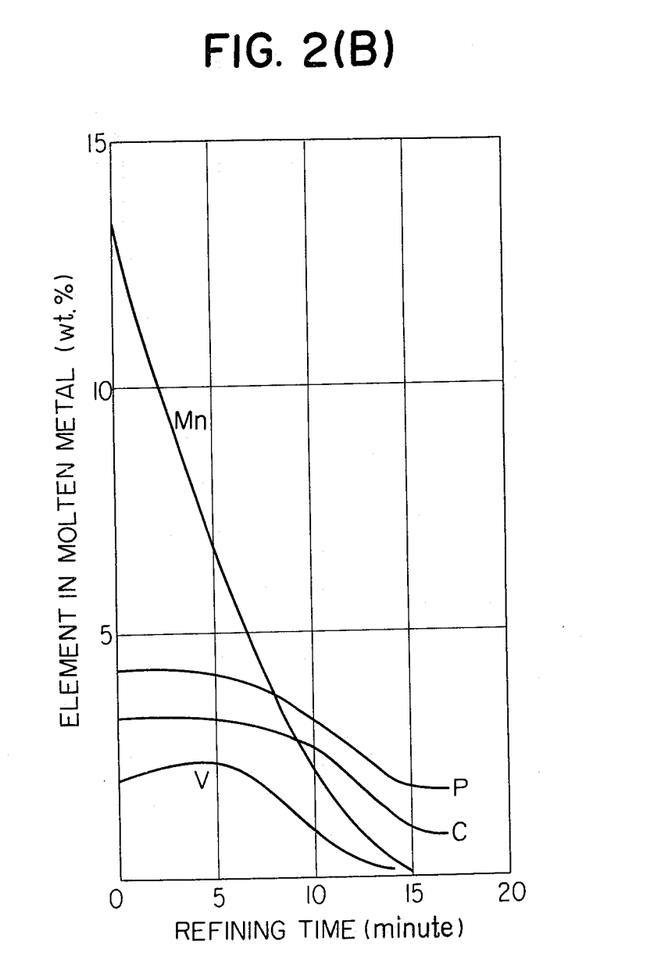
Figure 2C:
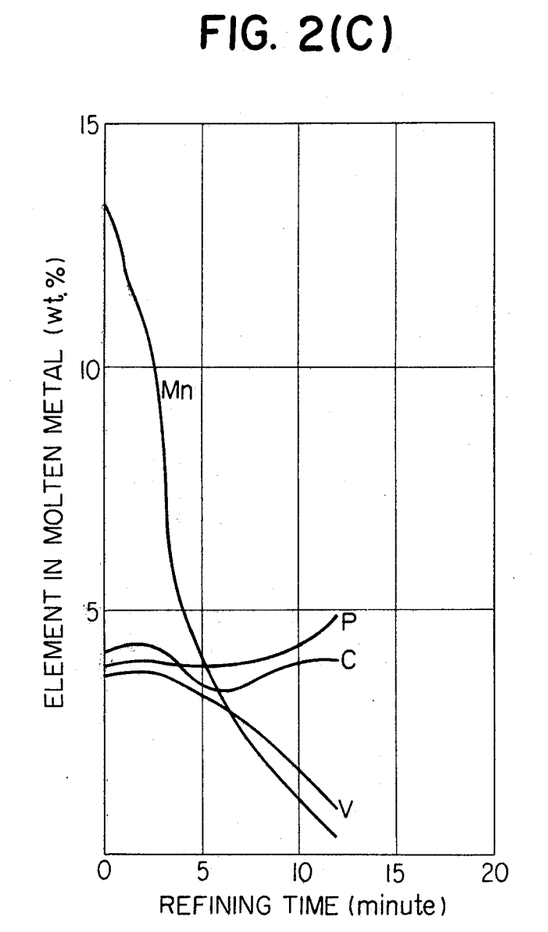

FIGS. 2(A), 2(B) and 2(C) are graphs illustrating, in the case where a molten metal produced during a reduction treatment of a steel slag was subjected to a secondary oxidation refining treatment after removal by oxidation of Ti and Si through a primary oxidation refining treatment, the relation between the time of said secondary oxidation refining treatment and the respective contents of Mn, V, P and C in said molten metal; FIG. 2(A) covering a case where, in said secondary oxidation refining treatment, a basic crucible made of magnesia was used without addition of a slag forming agent; FIG. 2(B) representing a case where, in said secondary oxidation refining treatment, a basic crucible made of magnesia was employed with addition of a slag forming agent; and, FIG. 2(C) showing a case where, in said secondary oxidation refining treatment, an acidic crucible made of silica was used without addition of a slag forming agent.

In the case where a basic crucible made of magnesia is used without addition of a slag forming agent, as shown in FIG. 2(A), removal by oxidation of Mn and V contained in the molten metal is insufficient for 15 minutes from the start of the secondary oxidation refining treatment, and when refining is containued beyond 15 minutes with a view to sufficiently remove Mn and V by oxidation, initiation of oxidation of P and C is anticipated. In the case where a basic crucible made of magnesia is employed with addition of a slag forming agent, as shown in FIG. 2(B), Mn and V are sufficiently removed by oxidation during 15 minutes from the start of the secondary oxidation refining treatment, but at the same time, P and C are also oxidized to a considerable extent. In the case where an acidic crucible made of silica is used without addition of a slag forming agent, as shown in FIG. 2(C), Mn and V are very effectively removed by oxidation during 15 minutes from the start of the secondary oxidation refining treatment, whereas P and C are not oxidized almost at all. In FIG. 2(C), the P content in the molten metal increases according as the secondary oxidation refining treatment proceeds, because removal by oxidation of Mn and V causes concentration of P.

The above-mentioned results of test revealed that, in order to efficiently remove by oxidation Mn and V while minimizing oxidation of P and C during the oxidation refining treatment of the molten metal, the most desirable practice is to use an acidic refining furnace lined with an acidic refractory without addition of a slag forming agent.

In the above-mentioned roasting treatment in the roasting kiln 12 and the leaching treatment in the leaching tank 13 of the secondary slag 9 recovered by the secondary oxidation refining treatment and the secondary slag discharge, it is necessary to cause efficient dissolution of $V_2O_5$ and $P_2O_5$ into the filtrate while minimizing dissolution of MnO into the filtrate.

Therefore, we have carried out many studies and tests on the roasting treatment and the leaching treatment of the secondary slag 9 satisfying the above-mentioned necessary conditions.

First, we carried out tests on an alkaline constituent to be added to the crushed secondary slag 9 to be roasted, roasting temperature and a slag forming agent. More specifically, the dissolution ratio into the filtrate of $V_2O_5$, $P_2O_5$ and MnO contained in the secondary slag 9 in the leaching tank 13 was measured, with the use of sodium chloride (NaCl) or sodium hydroxide (NaOH) as the alkaline constituent, at a roasting temperature of 750° C. or 850° C., with or without addition of lime (CaO) as the slag forming agent. The results of said measurement are given in Tables 1 and 2. Table 1 represents the case without addition of CaO, while Table 2, the case with addition of CaO. The amount of added NaCl or NaOH was three times that necessary for the formation of $NaVO_3$.

TABLE 1

| Alkaline constituent | Roasting temp. | Dissolution ratio (%) when roasting without addition of CaO | | |
|---|---|---|---|---|
| | | $V_2O_5$ | $P_2O_5$ | MnO |
| NaCl | 750° C. | 57 | 6 | 0.1 |
| | 850° C. | 87 | 10 | 1.0 |
| NaOH | 750° C. | 91 | 74 | 7.0 |
| | 850° C. | 93 | 78 | 8.0 |

TABLE 2

| Alkaline constituent | Roasting temp. | Dissolution ratio (%) when roasting with addition of CaO | | |
|---|---|---|---|---|
| | | $V_2O_5$ | $P_2O_5$ | MnO |
| NaCl | 750° C. | 24 | 2 | 0 |
| | 850° C. | 57 | 1 | 0 |
| NaOH | 750° C. | 95 | 35 | 0 |
| | 850° C. | 95 | 23 | 0 |

The results of measurement given in Tables 1 and 2 reveal the following facts:

(1) As the alkaline constituent to be added to the crushed secondary slag 9 to be roasted, NaOH gives higher dissolution ratio than NaCl.

(2) There is no remarkable difference between the two roasting temperatures of 750° C. and 850° C.

(3) There is no marked difference in dissolution ratio of $V_2O_5$ between the cases with and without addition of CaO as the slag forming agent, whereas dissolution of $P_2O_5$ and MnO is largely prevented by the addition of CaO.

With these facts in view, we measured the dissolution ratio into the filtrate of $V_2O_5$, $P_2O_5$ and MnO contained in the secondary slag 9 in the leaching tank 13, with the use of NaOH as the alkaline constituent to be added to the crushed secondary slag 9, by changing the amount of added NaOH from 1.0 to 1.5 and 2.0 times the amount necessary for the formation of $NaVO_3$, for $CaO/SiO_2$ ratios of 0, 0.5 and 1.0, respectively, with a view to making a more detailed examination. The results of said measurement are given in Table 3(a) to 3(c).

TABLE 3(a)

| Amount of NaOH | Dissolution ratio (%) with $CaO/SiO_2 = 0$ | | |
|---|---|---|---|
| | $V_2O_5$ | $P_2O_5$ | MnO |
| 1.0 times | 88 | 100 | 0 |
| 1.5 times | 93 | 100 | 0 |
| 2.0 times | 85 | 100 | 2 |

TABLE 3(b)

| Amount of NaOH | Dissolution ratio (%) with $CaO/Si_2 = 0$ | | |
|---|---|---|---|
| | $V_2O_5$ | $P_2O_5$ | MnO |
| 1.0 times | 74 | 29 | 0 |
| 1.5 times | 82 | 2 | 0 |
| 2.0 times | 88 | 42 | 0 |

TABLE 3(c)

| Amount of NaOH | Dissolution ratio (%) with $CaO/SiO_2 = 1.0$ | | |
|---|---|---|---|
| | $V_2O_5$ | $P_2O_5$ | MnO |
| 1.0 times | 78 | 8 | 0 |
| 1.5 times | 90 | 12 | 0 |
| 2.0 times | 81 | 2 | 0 |

The results of measurement given in Tables 3(a) to 3(c) demonstrate the following facts:

(1) as shown in Tables 3(b) and 3(c), in the cases with a $CaO/SiO_2$ ratio of 0.5 or 1.0, i.e., with addition of CaO as the slag forming agent, $V_2O_5$ shows a dissolution ratio of about 81 to 83% and dissolution of $P_2O_5$ and MnO is considerably prevented. As mentioned previously, it is necessary, in the leaching treatment in the leaching tank 13, to cause an efficient dissolution of $V_2O_5$ and $P_2O_5$ into the filtrate, while preventing dissolution of Mn into the filtrate as far as possible. It is not therefore desirable to add CaO as the slag forming agent; and, (2) as shown in Table 3(a), in the case with a $CaO/SiO_2$ ratio of 0, i.e., without addition of CaO as the slag forming agent, addition of NaOH in an amount twice as large as that necessary for the formation of $NaVO_3$ causes dissolution of $V_2O_5$ by 85% and $P_2O_5$ by 100%, also causing dissolution of Mn to some extent. In contrast, addition of NaOH in an amount of 1.0 to 1.5 times that necessary for the formation of $NaVO_3$ causes dissolution of $V_2O_5$ by about 90% and $P_2O_5$ by 100% while almost completely preventing dissolution of MnO, thus giving an ideal result.

Even when the secondary slag 9 is roasted in the roasting kiln 12 under the above-mentioned ideal and optimum conditions, the raw material 15 for manufacturing ferromanganese recovered as a residue after the leaching treatment in the leaching tank 13 still contains about 0.18 wt.% $P_2O_5$, as described above. This content poses no problem, however, because $P_2O_5$ contained in natural manganese ores has an allowable limit of 0.5 wt.%.

In the present invention, the molten metal is oxidation-refined in an acidic refining furnace 5 lined with an acidic refractory for the reason as described previously with reference to the graphs of FIGS. 2(a) to 2(c), and the use of an acidic refining furnace 5 lined with an acidic refractory is an ideal condition also for the leaching treatment of the secondary slag 9 in the leaching tank 13. More specifically, oxidation refining of the molten metal in a basic refining furnace lined with a basic refractory causes dissolution of the basic lining, thus causing the produced slag to contain basic constituents. As a result, P contained in the molten metal becomes more easily oxidizable. Therefore, inhibition of oxidation of P in the stage of oxidation refining of the molten metal cannot prevent oxidation of P to some extent. Consequently, the $P_2O_5$ content in the raw material 15 for manufacturing ferromanganese recovered as the residue by the leaching treatment in the leaching tank 13 may exceed the allowable limit of 0.5 wt.%. Thus, the use of an acidic refining furnace 5 lined with an acidic refractory for the oxidation refining treatment of the molten metal is also a necessary condition for obtaining a high-grade raw material 15 for manufacturing ferromanganese.

The process of subjecting the molten metal 4 to an oxidation refining twice in the acidic refining furnace 5 lined with the acidic refractory and efficiently recovering various useful substances from the resultant primary slag 7 and secondary slag 9 has been made clear in the above description. Now, the treatment of the molten metal 23 remaining in the acidic refining furnace 5 after said primary and secondary oxidation refining treatments is described below.

During said primary and secondary oxidation refining treatments of the molten metal 4, Fe and P in small quantities are oxidized and contained in the primary slag 7 and the secondary slag 9 in the form of $Fe_2O_3$ and $P_2O_5$, respectively, whereas Mn and V in small quantities are not oxidized and remain in the molten metal 23. As mentioned previously, the filtrate after the leaching treatment in the leaching tank 13 is transferred to the first precipitation tank 16, where dicalcium phosphate ($2CaO.P_2O_5$) is recovered as a fertilizer 18. This is to remove inevitably oxidized P and hence to improve the grade of the raw material 15 for manufacturing ferromanganese and the raw material 21 for manufacturing ferrovanadium, and P removed by the above-mentioned treatment accounts for only a small portion of P contained in the molten metal 4. Therefore, most of P in the molten metal 4 remains in the molten metal 23.

The molten metal 23 is therefore a high-phosporus pig iron containing about 90 wt.% Fe, about 5 wt.% P and about 4 wt.% C, with a P content far higher than the P content of about 1.7 to 1.8 wt.% in Thomas pig iron. In the present invention, therefore, the molten metal 23 with a very high P content is refined in accordance with a known high-phosphorus pig iron refining process. The following description covers the case where the molten metal 23 is refined by the Kaldo process, known as a process for refining Thomas pig iron.

In FIG. 1, 24 is a basic Kaldo furnace lined with a basic refractory. The molten metal 23 having the above-mentioned chemical composition is charged into the basic Kaldo furnace 24, and is oxidation-refined by adding CaO 32 as the slag forming agent, and blowing oxygen gas through the lance 25. Said oxidation refining treatment is conducted repeatedly until the P and C contents in the molten metal 23 are decreased to desired values.

More specifically, a third slag 26 containing about 18 wt.% $P_2O_5$, about 8 wt.% $SiO_2$, about 52 wt.% CaO, about 3.5 wt.% MgO and about 9 wt.% total Fe is recovered through a third slag discharge after a third oxidation refining treatment of the molten metal 23 in the Kaldo furnace 24. Since said third slag 26 has a high $P_2O_5$ content as about 18 wt.%, a Thomas phosphoric fertilizer 27 is obtained by crushing said third slag 26, after cooling and solidification, and sizing to a prescribed particle size. The $P_2O_5$ content in a Thomas hosphoric fertilizer is set forth as at least 16 wt.%. It is known however that a $P_2O_5$ content of over 20 wt.% leads to a lower citric solubility, a criterion of the effectiveness of a fertilizer, thus rendering $P_2O_5$ of no use. Therefore, the $P_2O_5$ content in the third slag 26 should preferably be within the range of from 16 to 20 wt.%.

Then, following the above-mentioned third oxidation refining treatment and third slag discharge, a fourth slag 28 and a fifth slag 29 both with a low P content are recovered by subjecting the molten metal 23 in the basic Kaldo furnace 24 to a fourth oxidation refining treatment and a fourth slag discharge, and then to a fifth oxidation refining treatment and a fifth slag discharge. The fourth slag 28 and the fifth slag 29 are reused by recycle as the slag forming agents in the oxidation refining treatment of the molten metal 23 in the basic Kaldo furnace 24.

A low-phosphorus high-quality steel 30 is obtained by subjecting the molten metal 23 in the basic Kaldo furnace 24 to the oxidation refining treatment and the slag discharge repeatedly several times.

In the above-mentioned oxidation refining treatment of the molten metal 23 in the basic Kaldo furnace 24, the use of a steel slag 31 discharged from a converter as the slag forming agent is economically very effective. The third slag 26 having the above-mentioned chemical composition discharged from the basic Kaldo furnace 24 is produced in an amount of 650 kg by employing 340 kg of the converter steel slag 31 and 170 kg of lime (CaO) per ton of the molten metal charged into the basic Kaldo furnace 24. As mentioned previously, the steel slag discharged from the converter contains about 50.4 wt.% CaO, about 16.3 wt.% total Fe, about 2.3 wt.% $P_2O_5$, about 15.3 wt.% $SiO_2$, about 2.0 wt.% MgO and others. It is therefore possible to supply CaO in an amount a half that required for the formation of said third slag 26 and Fe in an amount almost equal to that required for said formation, by using the converter steel slag 31 as the slag forming agent. Therefore, in the oxidation refining treatment of the molten metal 23 in the basic Kaldo furnace 24, there is no loss in Fe of the molten metal 23 and $P_2O_5$ is recovered as a portion of the Thomas phosphoric fertilizer 27. The use of the converter steel slag 31 as one of the slag forming agents provides a far larger advantage as compared with the use of lime $(Ca(OH)_2)$ 32 alone as the slag forming agent which results in an Fe loss. It is desirable to preheat the converter steel slag and lime (CaO) 32 to about 500° C. prior to charging into the basic Kaldo furnace 24 in heat balance consideration.

The third through the fifth oxidation refining treatments and slag discharges of the molten metal 23 may be carried out by an appropriate one among the known refining processes of high-phosphorus pig iron, not limited to the Kaldo process in the basic Kaldo furnace 24 as mentioned above.

The above description has covered the case where the third slag 26 recovered through the third slag discharge following the third oxidation refining treatment of the molten metal 23 in the basic Kaldo furnace 24 is utilized as the Thomas phosphoric fertilizer 27. The third slag 26 may also be utilized as a substitute for a phosphate rock serving as a raw material for manufacturing yellow phosphorus by carrying out said third oxidation refining treatment so that the $P_2O_5$ content of the third slag 26 may become about 20 to about 25 wt.%. More particularly, a phosphate rock generally contains about 30 wt.% $P_2O_5$, about 8 wt.% $CaF_2$ and a small amount of Fe. In contrast, the third slag 26 produced through the third oxidation refining treatment conducted as mentioned above in basic Kaldo furnace 24 contains 20 to 25 wt.% $P_2O_5$, 5 to 10 wt.% Fe and only a trace $CaF_2$. When manufacturing yellow phosphorus, therefore, the use of said third slag 26 as a substitute for phosphate rock results in the by-production of a larger quantity of iron phosphate than in the use of a phosphate rock. It is thus possible, in spite of the low apparent phosphoric volatility, to improve the substantial phsphoric volatility to almost 100% by returning said by-produced iron phosphate to the basic Kaldo furnace 24. In addition, the use of a phosphate rock for manufacturing yellow phosphorus requires treatment of fluorine (F) for pollution control purposes, which in turn requires a considerable amount of treating cost. On the contrary, the use of the third slag 26 for manufacturing yellow phosphorus requires no cost for the treatment of fluorine because the third slag 26 contains almost no $CaF_2$ as mentioned above. Therefore, the third slag 26, although having a slightly lower $P_2O_5$ content than in a phosphate rock and a high Fe content, is well comparable with a phosphate rocks as a raw material for manufacturing yellow phsphorus as a whole.

The above description has covered the case where, with the use of a molten metal 4 produced by a reduction treatment of a steel slag in a reduction furnace 1 as the starting raw material, said molten metal 4 is subjected to an oxidation refining treatment in an acidic refining furnace 5 lined with an acidic refractory, and then a molten metal 23 applied with the oxidation refining treatment in the acidic refining furnace 5 is subjected to an oxidation refining treatment in a basic Kaldo furnace 24 lined with a basic refractory. However, the process of the present invention is not limited to the above-mentioned embodiment. For example, the process of the present invention may be conducted by cooling and solidifying, in a pig casting machine, the molten metal 4 produced by the reduction treatment of the steel slag in the reduction furnace 1, remelting the cold metal thus obtained in a melting furnace such as an electric furnace, charging the remelted metal into the acidic refining furance 5, and then oxidation-refining said remelted metal as mentioned above, or may be carried out by cooling and solidifying, in a pig casting machine, the molten metal 23 applied with the oxidation refining treatment in the acidic refining furnace 5, charging the cold metal thus obtained into a steelmaking furnace using a high-phosphorus pig iron, and then oxidation-refining said cold metal by a known process.

Now, the process of the present invention is described more in detail by means of an example with reference to FIG. 1.

EXAMPLE

A molten metal 4 in an amount of 220 kg, having the chemical composition as shown in Table 4, produced, when manufacturing a steel slag cement from a steel slag discharged from a converter in accordance with the method of the earlier invention, during a reduction treatment of said steel slag, was used as the starting raw material.

TABLE 4

| Ti (wt.%) | Si (wt.%) | Mn (wt.%) | V (wt.%) | P (wt.%) | C (wt.%) | Fe and incidental impurities (wt.%) |
|---|---|---|---|---|---|---|
| 5.4 | 2.4 | 13.7 | 2.5 | 3.2 | 5.8 | balance |

Said molten metal 4 was charged into an acidic refining furnace 5 lined with an acidic refractory, and subjected to a primary oxidation refining treatment by blowing oxygen gas in an amount of 4.5 m³ per ton of molten metal through a lance 6, to oxidize most of Ti and Si contained in the molten metal 4. Then, a primary slag discharge was carried out while temporarily discontinuing oxygen gas blowing, and a primary slag 7 having the chemical composition as shown in Table 5 was recovered.

TABLE 5

| $TiO_2$ (wt.%) | $SiO_2$ (wt.%) | Total Fe (wt.%) | MnO (wt.%) |
|---|---|---|---|
| 37 | 30 | 27 | 6 |

As shown in Table 5, because said primary slag 7 contained 37 wt.% $TiO_2$, a blast furnace burden raw material 8 in an amount of 30 kg serving as a substitute for iron sand as a $TiO_2$ source for blast furnace operation was obtained by cooling and solidifying said primary slag 7, and then, crushing and sizing to a prescribed particle size.

Then, after the above-mentioned primary oxidation refining treatment and primary slag discharge, the molten metal 4 in the acidic refining furnace 5 was subjected to a secondary oxidation refining treatment by resuming oxygen gas blowing in an amount of 12 m³ per ton of molten metal, to oxdize most of Mn and V contained in the molten metal 4. Then, after the completion of oxygen gas blowing, a secondary slag discharge was carried out, and secondary slag 9 having the chemical composition as shown in Table 6 was recovered.

TABLE 6

| MnO (wt.%) | $V_2O_5$ (wt.%) | Total Fe (wt.%) | $P_2O_5$ (wt.%) | CaO (wt.%) | $SiO_2$ (wt.%) | $Al_2O_3$ (wt.%) | MgO (wt.%) |
|---|---|---|---|---|---|---|---|
| 45.3 | 30.9 | 13.7 | 2.4 | trace | 3.5 | 0.3 | trace |

After cooling and solidifying, said secondary slag 9 was crushed by a rod mill 10 to a particles size of 60 mesh, and said crushed secondary slag 9, added and sufficiently mixed with sodium hydroxide (NaOH) 11, was charged into a roasting kiln 12 to roast at a temperature of 700° to 900° C. for 30 to 60 minutes. The sinter thus obtained was crushed by a rod mill 10' to a prescribed particle size. The crushed sinter thus obtained was placed into a leaching tank 13 to subject to a leaching treatment by adding a filtrate 14. A residue in an amount of 50 kg having the chemical composition as shown in Table 7, which has been precipitated on the bottom of the leaching tank 13 as a result of said leaching treatment was recovered.

TABLE 7

|  |  | MnO (wt.%) | Total Fe (wt.%) | CaO (wt.%) | $SiO_2$ (wt.%) | $Al_2O_3$ (wt.%) | MgO (wt.%) | $P_2O_5$ (wt.%) |
|---|---|---|---|---|---|---|---|---|
| Residue |  | 67.8 | 20.6 | trace | 4.9 | 0.4 | trace | 0.18 |
| For comparison | Manganese ore from S. Africa | 62.0 | 11.7 | 4.0 | 5.5 | 0.5 | 0.6 | 0.08 |
|  | Manganese ore from Australia | 63.0 | 2.7 | 0.2 | 6.2 | 4.1 | 0.2 | 0.14 |
|  | Manganese ore from Brazil | 59.1 | 12.0 | 0.1 | 1.7 | 1.9 | 0.5 | 0.45 |

Table 7 gives figures concerning the residue in the case with a dephosphorization ratio of 95%. For comparison purposes, Table 7 also shows the chemical compositions of natural manganese ores produced in South Africa, Australia and Brazil.

As shown in Table 7, because said residue had a higher MnO content than in natural manganese ores, a high-grade raw material 15 for manufacturing ferromanganese was obtained by forming said residue into pellets.

On the other hand, the filtrate used for said leaching treatment in the leaching tank 13 was transferred into a first precipitation tank 16, where, after an adjustment to a prescribed value of pH, calcium chloride ($CaCl_2$) 17 was added. As a result, P dissolved in said filtrate reacted with $CaCl_2$ to form dicalcium phosphate ($2CaO.P_2O_5$), which was precipitated on the bottom of the first precipitation tank 16. Said precipitate was recovered and utilized as a fertilizer 18 mainly comprising $2CaO.P_2O_5$.

Then, said filtrate treated in the first precipitation tank 16 was transferred into a second precipitation tank 19, where, after an adjustment to a prescribed value of pH, sulfuric acid ($H_2SO_4$) 20 was added. As a result, V dissolved in said filtrate reacted with $H_2SO_4$, and a precipitate having the chemical composition as shown in Table 8 was formed in an amount of 10 kg on the bottom of the second precipitation tank 19.

TABLE 8

| $V_2O_5$ (wt.%) | $SiO_2$ (wt.%) | S (wt.%) | P (wt.%) | NaO (wt.%) | $Al_2O_3$ (wt.%) | $Fe_2O_3$ (wt.%) |
|---|---|---|---|---|---|---|
| 90-96 | 0.05-0.06 | 0.02-0.05 | 0.07 max | 4-10 | trace | trace |

As shown in Table 8, said precipitate, containing 90 to 96 wt.% $V_2O_5$, was recovered and utilized as a raw material 21 for manufacturing ferrovanadium.

On the other hand, the molten metal 23 containing about 90 wt.% Fe, about 5 wt.% P, and about 4 wt.% C, remaining in the acidic refining furnace 5 after the primary oxidation refining treatment and the primary slag discharge, and then the secondary oxidation refining treatment and the secondary slag discharge in the acidic refining furnace 5 as mentioned above, was charged into a basic Kaldo furnace 24 lined with a basic refractory; 28 kg of lime (CaO) 32 and 56 kg of converter steel slag 31 were added as the slag forming agents; and, the molten metal 23 was subjected to a third oxidation refining treatment by blowing oxygen gas in an amount of 10.5 m³ per ton of molten metal through a lance 25, to oxidize most of P and C contained in the molten metal 23. Then, a third slag discharge was conducted while oxygen gas blowing was temporarily discontinued, and a third slag 26 having the chemical composition as shown in Table 9 was recovered.

TABLE 9

| $P_2O_5$ (wt.%) | CaO (wt.%) | $SiO_2$ (wt.%) | Total Fe (wt.%) | MgO (wt.%) |
|---|---|---|---|---|
| 18.0 | 52.0 | 8.0 | 9.0 | 3.5 |

As shown in Table 9, because said third slag 26 contained 18 wt.% $P_2O_5$, a Thomas phosphoric fertilizer 27 in an amount of 110 kg was obtained by cooling and solidifying said third slag 26, and then crushing and sizing to a prescribed particle size.

Then, the molten metal 23 in basic Kaldo furnace 24 was subjected to a fourth oxidation refining treatment and a fourth slag discharge and then a fifth oxidation refining treatment and a fifth slag discharge by resuming oxygen gas blowing through the lance 25 after the above-mentioned third oxidation refining treatment and third slag discharge, and a fourth slag 28 and a fifth slag 29 having the chemical composition as shown in Table 10 were obtained.

TABLE 10

|  | P₂O₅ (wt.%) | CaO (wt.%) | SiO₂ (wt.%) | Total Fe (wt.%) | MgO (wt.%) |
|---|---|---|---|---|---|
| Fourth slag | 10.0 | 50.0 | 6.0 | 18.0 | 4.0 |
| Fifth slag | 7.0 | 43.0 | 4.0 | 27.0 | 6.5 |

The fourth slag 28 and the fifth slag 29 were used in recycle as the slag forming agents at the time of the above-mentioned third, fourth and fifth oxidation refining treatments of the molten metal 23 in the basic Kaldo furnace 24.

As a result of the repeated oxidation refining treatments and slag discharges applied to the molten metal 23 in the basic Kaldo furnace 24, a low-phosphorus high-quality steel 30 in an amount of 165 kg having the chemical composition as shown in Table 11 was obtained.

TABLE 11

| C (wt.%) | P (wt.%) | Mn (wt.%) | S (wt.%) | N₂ (wt.%) | Fe (wt.%) |
|---|---|---|---|---|---|
| 0.05 | 0.014 | 0.50 | 0.012 | 0.0025 | balance |

The process of the present invention has been described in detail, and according to the process of the present invention, the following effects are provided:

(1) A primary slag 7 is recovered by subjecting a molten metal 4 produced, when manufacturing a steel slag cement from a steel slag discharged from a converter, during a reduction treatment of said steel slag, to a primary oxidation refining treatment and a primary slag discharge in an acidic refining furnace 5 lined with an acidic refractory. A blast furnace burden raw material 8 serving as a substitute for iron sand as a $TiO_2$ source for blast furnace operation is obtained from the primary slag 7. The primary slag 7 has a higher $TiO_2$ content than iron sand. The operating cost may be reduced by conducting said primary oxidation refining treatment so as to give a $TiO_2$ content lower than the $TiO_2$ content in Iluminite ore and Rutile ore. Furthermore, the primary slag 7, which contains 20 to 40 wt.% $SiO_2$, 5 to 10 wt.% MnO and 20 to 40 wt.% total Fe, is very favorable as a blast furnace burden raw material, and gives the effect of preliminary oxidation of Mn for the next process.

(2) A secondary slag 9 is recovered by subjecting the molten metal 4 to a secondary oxidation refining treatment and a secondary slag discharge in the acidic refining furnace 5, following the above described primary oxidation refining treatment and primary slag discharge. A raw material 15 mainly comprising MnO for manufacturing ferromanganese and a raw material 21 mainly comprising $V_2O_5$ for manufacturing ferrovanadium are obtained from the secondary slag 9. Both these raw materials 15 and 21 have a low P content and are high in grade. In the process of the present invention, furthermore, MnO and $V_2O_5$ can be separated from each other by a simple recovering process, thus permitting recovery of the raw material 21 for manufacturing ferrovanadium very efficiently at a high yield.

(3) A third slag 26 and a low-phosphorus high-quality steel 30 are recovered by subjecting the molten metal 23 having high contents of P and C, which has been subjected to two oxidation refining treatments in the acidic refining furnace 5, to a third oxidation refining treatment and a third slag discharge in a basic Kaldo furnace 24 lined with a basic refractory. A Thomas phosphoric fertilizer 27 or a raw material for manufacturing yellow phosphorus is obtained from the third slag 26. The operating cost may be largely reduced by employing a converter steel slag 31 as the slag forming agent in said third oxidation refining treatment. A fourth slag 28 and a fifth slag 29, reovered through fourth and fifth oxidation refining treatments and slag discharges of the molten metal 23 in the basic Kaldo furnace 24, following said third oxidation refining treatment and said third slag discharge, are used as the slag forming agents in the above-mentioned third through fifth oxidation refining treatments.

(4) A mirabilite 22 obtained from the secondary slag 9 recovered through the secondary oxidation refining treatment and the secondary slag discharges of the molten metal 4 in the acidic refining furnace 5 is electrolytically decomposed into sulfuric acid ($H_2SO_4$) and sodium hydroxide (NaOH) which are used in recycle for the process of the present invention.

(5) Combination of the process of the present invention and the method for manufacturing a steel slag cement from a steel slag, disclosed in the earlier invention previously field by us, i.e., Japanese Patent Application No. 73,108/76, not only permits full utilization of a steel slag discharged from a converter, but also provides the following indirect effects. When a steel slag is utilized with the original chemical composition thereof as it is without changing its original chemical composition, or through separation of a steel slag into a few constituents, as in the prior arts (1) to (5) mentioned previously, the chemical composition of a steel slag discharged from a converter varies with operating conditions of the converter, resulting in variation of the quality of products manufactured from said steel slag, and products with a stable quality cannot be obtained. In contrast, combination of the process of the present invention and our earlier invention permits manufacture of a steel slag cement with a stable quality by only adding a chemical composition adjusting agent in a small quantity. Moreover, useful substances recovered from a molten metal produced during a manufacturing process of a steel slag cement almost always keep a constant quality even with a change in chemical composition of the steel slag, which leads to a change only in the yield, thus permitting manufacture of products with a stable quality.

According to the process of the present invention, as mentioned above, it is possible to almost totally recovery useful substances having a high added value from a molten metal produced during a manufacturing process of a steel slag cement, by a relatively simple process, and the quality of the recovered useful substances is equal or even superior to the quality of equivalent products commercially available, with, furthermore, an operating cost far smaller than the available benefits. In addition, combination of the process of the present invention and our earlier invention permits full utilization of a steel slag discharged from a converter, thus providing industrially useful effects.

What is claimed is:

1. A process for recovering and utilizing useful substances from a molten metal containing Ti, Si, Mn, V, P, C and the balance essentially iron, which has been produced in the process of manufacturing a steel slag cement from a steel slag discharged from a top-blowing oxygen converter, as the molten metal recovered during a reduction treatment of said steel slag, which comprises the steps of:

(1) oxidizing said molten metal in an acidic refining furnace lined with an acidic refractory to a primary oxidation treatment by blowing oxygen in contact with said molten metal to oxidize most of the Ti and Si contained in said molten metal into $TiO_2$ and $SiO_2$ which form a primary slag on the surface of said molten metal, and discharging said primary slag from said said acidic refining furnace to recover and utilize said primary slag as substitutes for iron sand for a blast furnace burden material; then (2) following said primary oxidation treatment and said primary slag discharge, oxidizing said molten metal in said acidic refining furnace to a secondary oxidation treatment by blowing additional oxygen in contact with said molten metal to oxidize most of the Mn and V contained in said molten metal into MnO and $V_2O_5$, which then form a secondary slag on the surface of said molten metal, and discharging said secondary slag from said acidic refining furnace to recover and utilize said secondary slag as a raw material mainly comprising MnO for manufacturing ferromanganese, a raw material mainly comprising $V_2O_5$ for manufacturing ferrovanadium, and a raw material for a phosphoric fertilizer; and then (3) following said secondary oxidation treatment and said second slag discharge, oxidizing said molten metal in a basic refining furnace lined with a basic refractory to a tertiary oxidation treatment while adding a slag forming agent by blowing oxygen in contact with said molten metal to oxidize most of the C, and P contained in said molten metal into $P_2O_5$, which then forms a tertiary slag on the surface of said molten metal, and discharging said tertiary slag from said basic refining furnace to recover and utilize said tertiary slag as a Thomas phosphoric fertilizer or a raw material for manufacturing yellow phosphorus; and (4) finally obtaining the remaining molten metal as a low-phosphorus high-quality steel.

2. The process as claimed in claim 1, wherein steel slag discharged from a top-blowing oxygen converter is used at least as a portion of said slag forming agent to be added during said tertiary oxidation treatment in said basic refining furnace lined with a basic refractory.

3. The process as claimed in claim 1, wherein said tertiary oxidation treatment and said tertiary slag discharge in said basic refining furnace lined with a basic refractory are repeatedly carried out.

4. The process as claimed in claim 1, wherein, after cooling and solidification, said primary slag is crushed and sized to a prescribed particle size which is a substitute for iron sand as a blast furnace burden material.

5. The process as claimed in claim 1, wherein, after cooling and solidification, said tertiary slag is crushed and sized to a prescribed particle size which is useful as a Thomas phosphoric fertilizer or a raw material for yellow phosphorus.

6. The process as claimed in claim 1, wherein, after cooling and solidification, said secondary slag is crushed and sized to a prescribed particle size; the crushed slag is subjected to an alkali roasting treatment followed by a leaching treatment using a filtrate to dissolve $V_2O_5$ and $P_2O_5$ contained in said crushed slag into said filtrate, and MnO is recovered as a residue which is useful as a raw material for manufacturing ferromanganese; said filtrate is admixed with $CaCl_2$ to form a primary precipitate which is recovered and utilized as a fertilizer mainly comprising $2CaO.P_2O_5$; and then said filtrate is admixed with $H_2SO_4$ to form a secondary precipitate which is recovered and which is useful as a raw material mainly comprising $V_2O_5$ for manufacturing ferrovanadium.

7. The process as claimed in claim 10, wherein mirabilite is recovered from said filtrate used in said leaching treatment, said mirabilite being electrolytically decomposed into sodium hydroxide (NaOH) and sulfuric acid ($H_2SO_4$), and the resultant sodium hydroxide and sulfuric acid are used in recycle as additives respectively in said roasting treatment and said leaching treatment.

* * * * *

UNITED STATES PATENT AND TRADEMARK OFFICE
CERTIFICATE OF CORRECTION

PATENT NO. : 4,260,414
DATED : April 7, 1981
INVENTOR(S) : GYOICHI SUZUKI et al

It is certified that error appears in the above—identified patent and that said Letters Patent is hereby corrected as shown below:

Column 15, line 66, "phsphorus" should be --phosphorus--.

Column 22, line 36, "10" should be --6--.

Signed and Sealed this

Thirteenth Day of April 1982

[SEAL]

Attest:

GERALD J. MOSSINGHOFF

Attesting Officer

Commissioner of Patents and Trademarks